Figure 1:
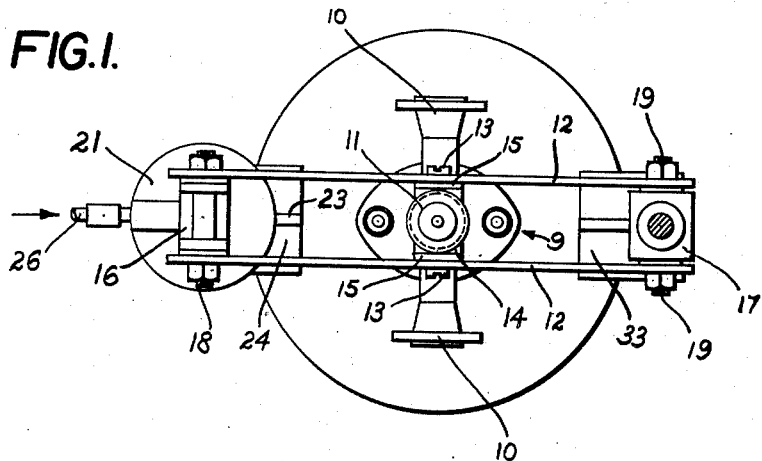

Oct. 3, 1950   W. W. DIENER   2,524,343
CONTROL MECHANISM
Filed Jan. 29, 1947

INVENTOR.
WILLIAM W. DIENER
BY E. J. Liebrecht
William Klabunde
ATTORNEYS

Patented Oct. 3, 1950

2,524,343

UNITED STATES PATENT OFFICE 2,524,343

CONTROL MECHANISM

William W. Diener, Elizabeth, N. J., assignor to The M. W. Kellogg Company, Jersey City, N. J., a corporation of Delaware Application January 29, 1947, Serial No. 724,958

5 Claims. (Cl. 74—470)

This invention relates to a control mechanism for controlling the movement of a longitudinally movable elongated member, and particularly a member subject to forces tending to effect longitudinal movement thereof independently of said control means.

Control mechanisms of the type and for the purposes contemplated in the present invention may be employed to advantage in the chemical, processing, or petroleum refining industries wherein vessels and conduits of relatively large proportions are commonly employed. The process and service conduits and various other equipment associated with such vessels are necessarily of a correspondingly large size, so that, when process operations are to be carried out under relatively severe temperature conditions, the problem of counteracting the injurious effects of excessive expansion in the apparatus becomes acute.

It has therefore been the practice to provide various expedients whereby the expansion of the various apparatus elements may be controlled and the forces of expansion be permitted to dissipate in such manner as to minimize the danger of injury or damage to the apparatus.

While the present invention is considered to have a fairly broad application, it is especially suited for the external control of an elongated valve stem extending through a vessel wall and providing at the inner end a closure means for an elongated conduit, such as the internal standpipe or carrier line commonly employed in fluid catalytic processes. In processes which are carried out at high temperatures, there is considerable expansion in the standpipe or carrier line when the apparatus is brought from normal temperature conditions up to the desired operating temperature. If it is desired to maintain the closure member associated with the carrier line or standpipe in its closed position during such period, the expansion in the elongated members may be of such magnitude as to cause distortion or breakage of the apparatus. It will readily be apparent that various other applications may be found wherein a longitudinally movable element provided with a control means for effecting its longitudinal movement, may be positioned in contact with a member which may exert an excessive longitudinal force against the moveable element.

A principal object of the present invention, therefore, is to provide a control mechanism of sturdy, simple and economical design for moving an elongated member along a longitudinal path of movement, having associated therewith means for permitting the mechanism to yield upon the application to said member of longitudinal forces in excess of a predetermined maximum.

Another object is to provide a control mechanism for moving an elongated member along a longitudinal path of movement in which an expandable member forms a limiting stop, having associated therewith a yieldable member adapted to yield to forces exerted by the expandable member against the elongated member in excess of a predetermined maximum.

Figure 2:
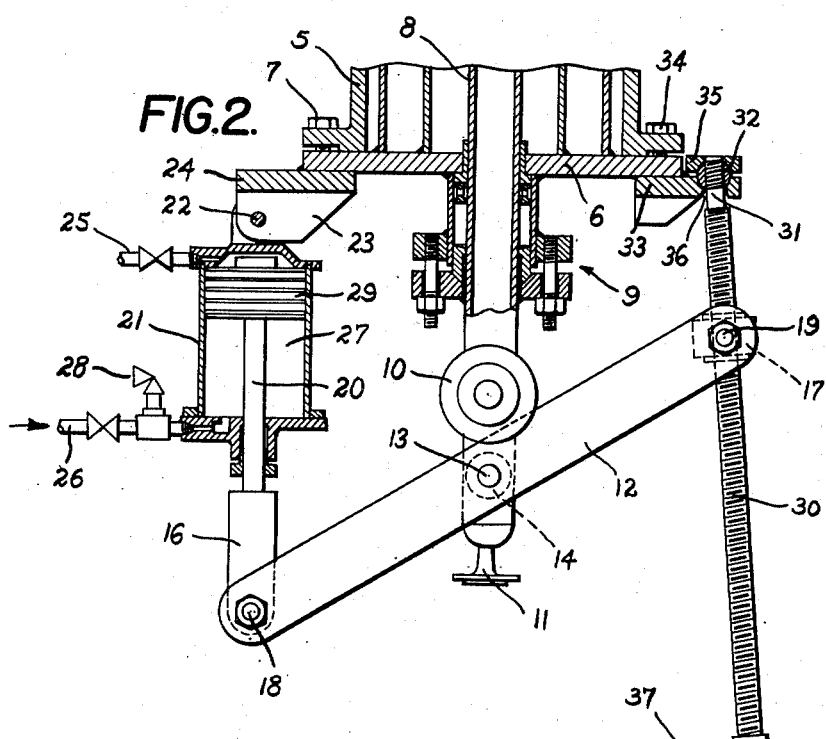

These and other objects are effected by my invention, as will be apparent from the following discussion and claims taken in connection with the accompanying drawing forming a part of this application, in which:

Fig. 1 shows the control mechanism viewed endwise in the direction of the longitudinal path of movement of the elongated member; and Fig. 2 is an elevation view partly in section of the mechanism of Fig. 1.

For the purpose of illustrating one application of the present invention, the invention will be described hereinafter particularly in connection with an elongated tubular member extending through a vessel wall and adapted for longitudinal movement through a packed joint provided between the tubular member and the vessel wall.

Referring to the drawings, a fragmentary portion 5 of a vessel is shown provided with a removable wall member or cover plate 6 attached thereto, as by machine screws 7. An elongated member such as a conduit 8 extends through the wall 6 and is provided with a packed joint of conventional design, generally indicated by the numeral 9 adapted to seal the joint and provide for free longitudinal movement of the member 8 through the member 6. Tubular member 8 is provided at its outer end with side connectors 10 and an end connector 11 providing fluid access to the tubular member. It may be considered, although it is not shown in the drawing, that the inner end of tubular member 8 may be subjected to forces tending to move it outwardly with respect to the wall 6. Such forces, for example, might be exerted by reason of the inner end of tubular member 8 being arranged to abut against a fixed member, and the member 8 being caused to expand by reason of a temperature rise within the vessel, or the tubular member 8 may be considered as abutting against a member within the vessel 5 which itself is subjected to expansion by reason of a temperature change, or movement for any other reason.

The control mechanism for actuating tubular member 8 comprises a pair of parallel link members 12 pivotally mounted substantially midway between their ends on diametrically opposite pivot pins 13 set in bosses 14 formed on or attached to the outer walls of tubular member 8. Washers 15 separate the bosses from the link members 12.

Link members 12 are connected at their ends by yoke members 16 and 17 pivotally attached to the link members at 18 and 19, respectively. Yoke member 16 is attached to the end of a piston rod 20 of a hydraulic cylinder 21, of conventional design. The hydraulic cylinder 21 is pivotally suspended at 22 from a depending lug portion 23 of a bracket 24 attached to the member 6, as by welding or by means of the machine screws 7. The hydraulic cylinder 21 is freely rotatable about the pivot 22 preferably in a plane which includes the axes of the tubular member 8 and the piston rod 20. Valved outlets 25 and 26 are provided at the ends of hydraulic cylinder 21 in communication with the cylinder chamber 27. Outlet 26 includes also a pressure relief valve 28, which may be set to release when the pressure within the chamber 27 is increased by outward movement of the piston 29 beyond a predetermined maximum. While the hydraulic cylinder 21 is set to operate upon the application of a force tending to move the piston downwardly, as shown in the drawing, it is obvious that, where forces tending to move the conduit 8 inwardly with respect to the vessel wall are to be allowed for, the mode of operation may be reversed by placing a relief valve in the outlet 25, and having the direction of flow of the fluid supplying pressure to the piston reversed so that the piston 29 is normally at the lower end of its stroke.

Pivoted yoke member 17, connecting the opposite ends of link members 12, has a central transverse opening threaded to receive an elongated feed-screw 30. Feed-screw 30 has a short portion 31 of reduced diameter at one end threaded to receive in tight connection a drilled and tapped ball member 32. Ball member 32 is retained in a ball-and-socket connection between a bracket 33, attached to member 6 by screws 34, and a plate member 35 attached to bracket 33, as by screws, not shown. Bracket 33 and plate 35 have complementary socket portions to receive the ball 32. The end of feed-screw 30 projects through a tapered opening 36 in the bracket 33, so that the feed-screw 30 may rotate freely about its axis and also be angularly displaced about the center of ball member 32 a limited amount in any direction, dependent upon the size and taper of opening 36. The free end of feed-screw 30 is provided with a hand-crank 37 by which it may be manually operated to move the yoke 17 toward or away from the vessel 5.

The displacement of yoke 17 through operation of the hand-crank 37 causes links 12 to act as a second class lever in rotating about the pivot 18 as a fulcrum. Since, in the preferred mode of operation, hydraulic cylinder 21 is normally acting to hold the piston rod 20 fully retracted, the pivot 18 remains substantially stationary while the member 8 is moved in a longitudinal direction.

As the member 8 is moved along its path, the links 12 are angularly displaced with respect to its axis. Since pivot points 13, 18, and 19 are fixed with respect to the links 12, angular displacement of the latter causes the yoke members 16 and 17 to be moved in an arcuate path about the pivots 22 and 32, respectively, toward or away from the axis of member 8.

For any particular setting of the feed-screw 30, the member 8 tends to remain in fixed position. It is contemplated, however, that in certain instances a backward thrust may be placed upon the member 8. Such thrust may be caused by a longitudinal expansion in the member 8 while its opposite end is fixed, or restrained from longitudinal movement toward that end. Or, an independent longitudinal force may be externally applied to the opposite end of member 8. In any case, provision is made in the linkage arrangement to dissipate the force before injury is caused to the element 8 or elements associated with it. As may be seen from an inspection of Fig. 2, a longitudinal force applied to member 8 in a direction outwardly of the vessel 5 causes links 12 to operate as a third class lever, pivoting about the fixed point 19 as a fulcrum. When the force applied through the linkage to the piston of the hydraulic cylinder exceeds its predetermined maximum, the piston may move outwardly to partially relieve the compressive force on the member 8. The force necessary to cause the hydraulic cylinder to yield is determined by the setting of the relief valve 28.

It is obvious from the arrangement shown that instead of cylinder 21 being used as a safety device, it may also be used as the prime mover for actuating the member 8. In such application, suitable pressure control mechanism is connected in circuit with the hydraulic cylinder through lines 25 and 26.

I claim:

1. A control mechanism for effecting longitudinal movement of an elongated movable element extending through a vessel wall comprising a link member pivotally mounted intermediate its ends on the external portion of said movable element, a second link member of adjustable length pivotally attached at one end to said vessel wall and at the other end to one end of said pivotally mounted link member, and a third link member of extensible length pivotally connected at one end to said vessel wall and at the other end to the other end of said pivotally mounted link member, said third link member being adapted to extend upon the application of a longitudinal force in excess of a predetermined maximum transmitted through said linkage from said movable element.

2. A control mechanism for effecting longitudinal movement of an elongated movable element extending through a vessel wall comprising a link member pivotally mounted intermediate its ends on the external portion of said movable element, a second link member of adjustable length pivotally attached at one end to said vessel wall and at the other end to one end of said pivotally mounted link member, and a third link member of extensible length pivotally connected at one end to said vessel wall and at the other end to the other end of said pivotally mounted link member, said extensible link member including hydraulic means normally maintaining full contraction thereof and being adapted to extend upon the application of a longitudinal force in excess of a predetermined maximum transmitted through said linkage from said movable element.

3. A control mechanism for effecting longitudinal movement of an elongated movable element extending through a vessel wall comprising a link member pivotally mounted intermediate its ends on the external portion of said movable element, a second link member of adjustable length pivotally attached at one end to said vessel wall and at the other end to one end of said pivotally mounted link member, and a third link member of extensible length pivotally connected at one end to said vessel wall and at the other end to the other end of said pivotally mounted link member, said third link member being adapted to extend upon the application of a longitudinal force transmitted through said linkage from said movable element.

4. A control mechanism of the character described comprising an elongated member movable in an axial direction through a fixed wall member, a link member pivotally mounted intermediate its ends on the outer portion of said elongated member, a second link member connected at one end to said fixed member in a ball-and-socket arrangement and having an intermediate threaded portion, a block member having an internally threaded opening to receive said threaded portion, said block member being pivotally connected to one end of said piovtally mounted link member, means for rotating said second link member to vary its effective length by movement of said block member along said threaded portion, and a third link member of extensible length connecting said fixed member and the other end of said pivotally mounted link member, said extensible link member comprising a hydraulic cylinder having its housing pivotally connected to said fixed member and the outer end of its piston pivotally connected to the pivotally mounted link member, said hydraulic cylinder normally maintaining said piston in fully contracted position and being adapted to extend upon the application of a longitudinal force in excess of a predetermined maximum transmitted through said linkage from said movable element.

5. A control mechanism for effecting longitudinal movement of an elongated movable element extending through a vessel wall comprising a hydraulic cylinder and a piston reciprocable therein, said cylinder being connected with a source of fluid pressure, linkage means pivotally connected to the end of said movable element and to said piston and adjustable feed means in cooperative engagement with said linkage means for angularly displacing said linkage means to effect movement of said movable element along its longitudinal path, said linkage means and said feed means normally providing a rigid connection between said movable element and said piston, whereby said movable element may be moved independently of said feed means by movement of said piston in response to pressure changes within said hydraulic cylinder, said piston being adapted to yield within said cylinder upon the application of a longitudinal force in excess of a predetermined maximum transmitted through said linkage from said movable element.

WILLIAM W. DIENER.

REFERENCES CITED

The following references are of record in the file of this patent:

UNITED STATES PATENTS

| Number | Name | Date |
|---|---|---|
| 259,022 | Jarecki | June 6, 1882 |
| 803,149 | Clark | Oct. 31, 1905 |
| 1,926,174 | Reilly et al. | Sept. 12, 1933 |
| 2,202,217 | Mallory | May 28, 1940 |

FOREIGN PATENTS

| Number | Country | Date |
|---|---|---|
| 27,181 | Great Britain | Mar. 12, 1914 |